United States Patent [19]
Brown et al.

[11] 3,859,473
[45] Jan. 7, 1975

[54] CENTRALIZED ATTENDANT SERVICE ARRANGEMENT FOR PABX COMPLEX

[75] Inventors: Wilbert C. Brown, Penfield; Arthur E. Hoctor, Rochester, both of N.Y.

[73] Assignee: Stromberg-Carlson Corporation, Rochester, N.Y.

[22] Filed: July 31, 1973

[21] Appl. No.: 384,336

[52] U.S. Cl. .......................... 179/27 CA, 179/18 HA
[51] Int. Cl. .............................................. H04m 3/00
[58] Field of Search ........... 179/18 HA, 27 R, 27 B, 179/27 CA, 27 FF, 18 BF

[56] References Cited

UNITED STATES PATENTS

| | | | |
|---|---|---|---|
| 3,377,432 | 4/1968 | Abbott et al. | 179/27 CA |
| 3,417,204 | 12/1968 | Richards | 179/27 CA |

*Primary Examiner*—Thomas A. Robinson
*Attorney, Agent, or Firm*—William F. Porter, Jr.

[57] ABSTRACT

Centralized attendant services are provided for a plurality of private automatic branch telephone exchanges each including a common control. A plurality of attendant positions are provided at a single location and are connected to line circuits in each of the automatic telephone exchanges and an automatic steering circuit is provided in each exchange. The steering circuits automatically extend each incoming call via an incoming trunk, the switching matrix in the telephone exchange and a line circuit, over a two-wire line to an attendant position. The attendant, upon receiving the request of the calling party, places the calling party on hold and dials or keys the desired called number. When a connection is completed to the called line, the attendant releases from the call. The call automatically camps-on a busy line and calls are automatically timed-out and returned to an attendant if a camped-on line remains busy or if, after ringing begins, an idle called line does not go off hook after a predetermined period of time. Provisions are included for recalling an attendant, for notifying the attendant that either a time-out or a recall has occurred, and for conversion to localized attendant service for individual telephone exchanges.

6 Claims, 4 Drawing Figures

Patented Jan. 7, 1975 3,859,473

3 Sheets-Sheet 1

CENTRALIZED ATTENDANT SERVICE ARRANGEMENT FOR PABX COMPLEX

BACKGROUND OF THE INVENTION

This invention relates to a centralized attendant service (CAS) arrangement for automatic telephone exchanges generally and more particularly to a CAS arrangement for a complex of private branch automatic telephone exchanges.

Private ownership or rental of telephone switching equipment has become increasingly common in recent years. For a variety of reasons — for example, cost and convenience — many businesses and organizations have found it expedient to install either customer owned or leased central telephone facilities — for example, a central switchboard — locally. Due in large measure to recent technological advances, together with the increased size of many establishments, it has become desirable to install equipment which performs many switching functions automatically both to improve service within the local exchanges and to reduce the number of attendants required to perform the remaining switching functions, to provide calling information and to service incoming (or outgoing) calls to (or from) the local exchanges. As a result, private branch automatic telephone exchanges (PABX's) are now in relatively widespread use. Such PABX's s typically utilize a common control system controlled by a stored program, which automatically connects (via a switching matrix) incoming calls to an attendant position, local calls between local stations and outgoing calls from local stations to outgoing trunks which in turn connect the outgoing calls to a central office.

Quite frequently, a particular business — for example, a department store — has facilities at several locations and a separate local exchange is located in each facility. Often, attendants are required at each facility to service each local exchange. As is apparent, the provision of attendants at each local exchange on a one-to-one basis results in undesirable duplication of efforts and manpower. For example, if an incoming caller to one department store branch must be redirected to another store branch, a first attendant must service the incoming call to the first store branch and — if it is possible to transfer calls from one PABX to another PABX without requiring the calling party to dial a new number — the first or another attendant must effect a connection to the second PABX where the call is received by still another attendant. Such attempts to reach the particular department in a branch store at which the calling party — who is often a potential customer — may speak to the appropriate called party is time consuming and bothersome for the calling party who must repeat his inquiry each time a different attendant is connected to the call.

From the point of view of the company, such a calling arrangement is unsatisfactory also, since the potential customer may become disgruntled even before being connected to the appropriate number and a sale may be lost. In addition, from both a manpower and payroll viewpoint, it is undesirable to require more attendants than is absolutely necessary to service calls in all of the company branch exchanges. A centralized attendant service at which all incoming calls to a plurality or complex of branch exchanges owned or leased by the same business would be handled would, therefore, be highly desirable both from the view of the calling party and from that of the particular business. The calling party then need only remember and dial the number of one branch in order to be connected to the particular department in the appropriate branch of the business to respond to his inquiry. The business, in addition to eliminating a source of aggravation to potential customers, can eliminate the necessity of hiring attendants whose functions would often overlap and whose efforts would be duplicative.

Prior art systems have been developed to provide such centralized attendant service for a complex of private branch exchanges. In these prior art systems, one attendant position location has been established for a group of private branch exchanges. Incoming calls to any of the branch exchanges seize incoming trunks located in the particular branch exchange and the calls are connected through a crossbar switch located external to the exchange switching matrix and are extended out over a two-wire line to an attendant position location at which either an indicating lamp or ringing notifies the attendant of the incoming call. The attendant answers the call, receives the instructions of the calling party and dials the desired called line number. The dial pulses set a switch train over a second two-wire line through a second crossbar switch to the same incoming trunk and a connection is effected from the incoming trunk through the switching matrix to the particular local called station. When the connection is complete, ringing is applied to the called line, the calling party and the attendant receive ringback tone and the attendant releases from the call. When the attendant releases from the call, however, only that portion of the connection between the crossbar switches and the attendant position location is released. The remainder of the connection from the calling party through the incoming trunk into one crossbar switch and from the other crossbar switch back to the incoming trunk, the called station is maintained until the call is terminated or the calling party returns on hook.

Thus, although the prior art CAS arrangement performs the function for which it was intended, that system requires the use of four-wires to extend the call from the incoming trunk in the PABX to the attendant position location via one crossbar switch and back via the second crossbar switch, the incoming trunk and the switching matrix to the called line. Furthermore, the prior art system requires the addition of a number of additional crossbar switches external to the switching matrix at each exchange, rather than using free paths through the particular switching matrices. In addition, even after the attendant releases from the call, four-wires remain connected between the incoming trunk and the crossbar switches. Finally, in the prior art CAS system, only rotary dial equipment may be utilized since step-by-step switches are utilized in the switching matrix. It is apparent that it would be highly advantageous to provide a CAS arrangement which is adaptable for use with dual tone multifrequency signaling equipment in order to reduce the time which the attendants must devote to signaling the requested called lines.

Accordingly, it is an object of the present invention to provide a centralized attendant service (CAS) arrangement which permits all incoming calls to a complex of PABX's to be handled at a single attendant position location.

Another object of the present invention is to provide such a CAS system which extends a connection to an attendant position over a two wire facility and which connects the incoming call to the requested call line directly from the incoming trunk through the switching matrix, while permitting all connections between the incoming trunk and the attendant position to be released once the connection to the called line has been effected.

A further object of the present invention is to provide such a CAS arrangement which may be utilized with either or both of dial pulse and multifrequency signaling equipment.

Still another object of the present invention is to provide such a CAS arrangement which automatically camps-on a busy called line and automatically reconnects the calling party to a free attendant position if an idle called line is not answered or if a camped-on called line does not become free within a predetermined period of time after the calling party is connected thereto.

Yet another object of the present invention is to provide such a CAS arrangement which permits an attendant, upon answering an incoming call, to be informed automatically whether the particular calling party is being connected to an attendant position for the first or a subsequent time during his call.

Still another object of the present invention is to provide such a CAS arrangement which permits an attendant to transfer an incoming call made to one PABX to another PABX in the complex.

Still another object of the present invention is to provide such a CAS arrangement which permits conversion to local attendant service within one or more of the individual PABX's when desired.

BRIEF DESCRIPTION OF THE DRAWINGS

Other objects, features and advantages of the present invention will become apparent from the following description of a preferred embodiment, taken together with the attached drawings thereof, in which.

DESCRIPTION OF THE PREFERRED EMBODIMENT

Figure 1:
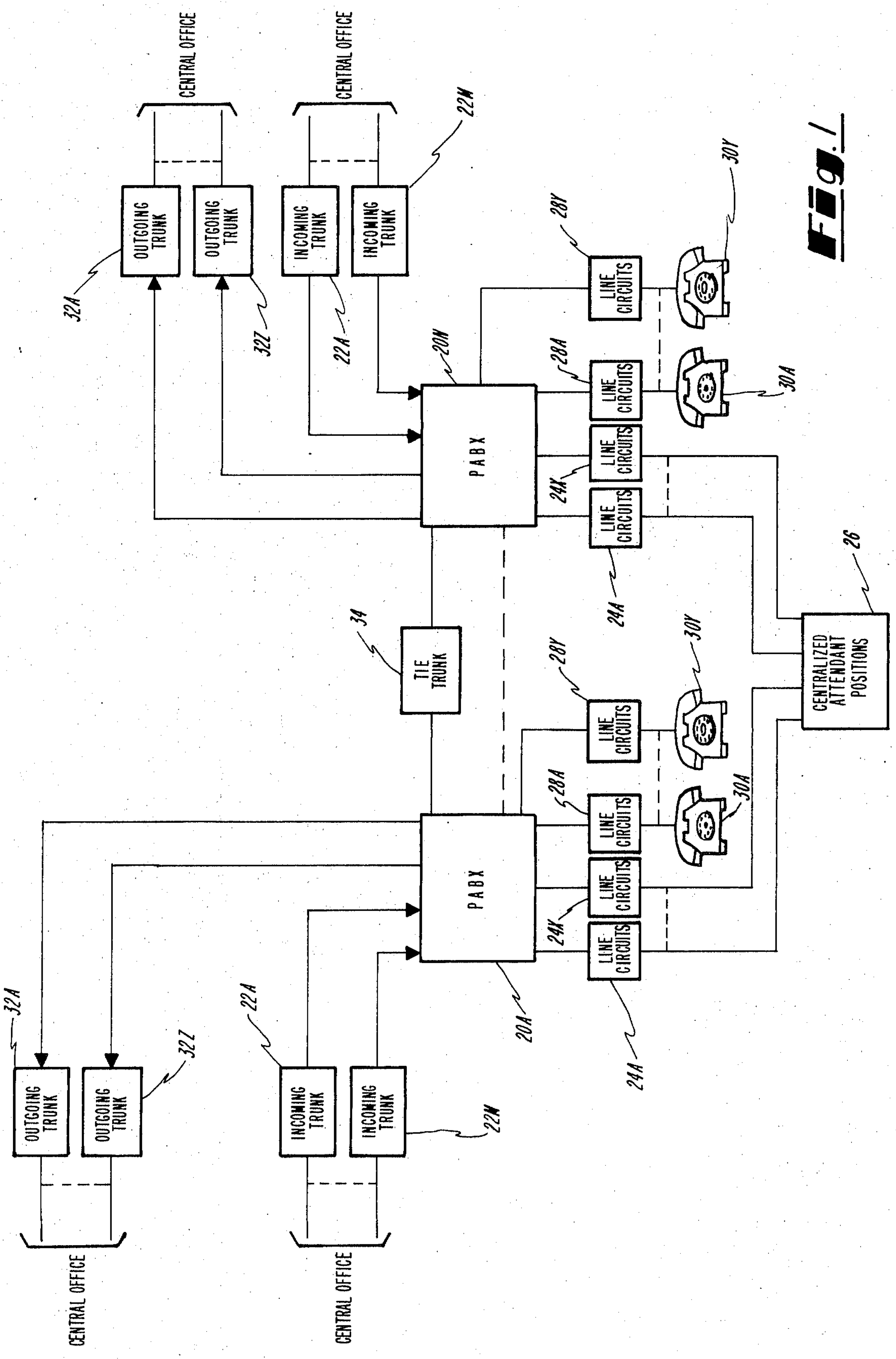
FIG. 1 is a basic block diagram of a private branch automatic telephone exchange complex embodying the centralized attendant service arrangement of the present invention.

Referring now to FIG. 1, there is shown a complex of private branch automatic telephone exchanges (PABX's ) 20A–20N, which utilize the centralize attendant service arrangement of the present invention. Each PABX 20A–20N is arranged to receive incoming calls from a central office (not shown) via any of a plurality of incoming (centralized attendant service or "CAS") trunks 22A–22M, and to establish a connection under the control of a common control system (to be described in greater detail below) from the seized incoming trunks 22A–22M via a switching matrix and either via one of a plurality of (typically up to 20 ) line circuit groups 24A–24X (each typically containing up to seven line circuits) to one or more centralized attendant positions 26 or, when it is desired not to use the centralized attendant service arrangement, via one of a plurality of line circuit groups 28A–28Y for direct connection of incoming calls to individual line stations 30A–30Y (only one station 30 is shown connected to each line circuit group 28 for simplicity in illustration). When the centralized attendant service arrangement is utilized, incoming calls are first connected to centralized attendant positions 26 and an attendant then connects the calling party with the desired called line 30A–30Y.

Each PABX is also provided with a plurality of outgoing trunk circuits 32A–32Z for connection of calls from the PABX to a central office (typically, each PABX 20A–20N is connected to a different central office) and with at least one tie trunk 34 which provides connections between individual PABX's under the control of the common control system.

The centralized attendant positions 26 may consist of an individual telephone, an attendant's console, a key system, an automatic call distribution (ACD) system or any other suitable device and, as will be outlined in greater detail below, the operation of any of these devices may be either rotary dial or dual tone multifrequency (DTMF).

In operation, a central office subscriber dials the listed directory number of a PABX 20A–20N and ringing voltage from the central office seizes an incoming trunk 22A–22M. When a call is received by an incoming (CAS) trunk 22A–22M, and the centralized attendant service arrangement is being utilized, an automatic steering circuit (to be discussed in greater detail below) in the particular PABX 20A–20N transmits a signal to the line scanner in the common control system which establishes a connection from that incoming trunk 22A–22M to a free line in a centralized attendant line circuit group 24A–24X and thereupon to the corresponding free attendant position 26. If all attendant positions 26 are busy, the trunk 22A–22M ceases its attempt to seize a line in groups 24A–24Y and returns ringback tone to the calling party until a line is free. When a line becomes free, a connection is then completed. The attendant at that position answers the incoming call. When the attendant answers, loop seizure is extended back to the PABX and ring trip occurs. The calling party requests either a particular called party or a particular called line number and the attendant simulates a hookswitch flash and either dials or keys (depending upon whether the position equipment is rotary dial or pushbutton, respectively) the directory number of the called party. As will be explained in greater detail below, the simulated hookswitch flash automatically places the calling party on hold, while the called directory number is transferred to a local register which transmits the called line number to a line scanner and digit store circuit in the PABX common control system. If the attendant equipment is DTMF equipment, the multifrequency signals corresponding to the called line number are first transmitted from the local register to a multifrequency tone converter and converted to dial pulse signals which are then transmitted back to the local register before being sent to the line scanner. When the line scanner has marked and seized the designated called line, the common control system effects a connection between the calling (central office) party and the called line via a bridge circuit in the incoming trunk 22A–22M and applies ringing to the called line. At this time the attendant releases from the call by depressing a disconnect button and the established connection is between the incoming trunk 22A–22M and the called line with the path to the attendant position completely released. The central office party receives ringback tone until the called party answers and ring trip occurs. Should the ringing continue for 30 seconds, a time-out cycle is initiated in the common control system and the automatic steering circuit again establishes a connection through the switching matrix to the attendant position 26. Upon answering, the attendant receives a one-half second burst of tone indicating that a time-out has occurred and may then ask the calling party for further instructions. After a time-out occurs and the attendant answers, a three-way connection between the calling party, the attendant the called line is maintained until either the attendant releases or the calling party returns on hook.

In the event that the called line dialed or keyed by the attendant is busy, the common control system effects a connection between the calling party and the called station and the call camps-on the called station and returns ringback tone to the calling party until the called station becomes idle. If the called station does not become idle within 30 seconds, a time-out cycle is initiated in the common control system and a connection is re-established to the attendant position 26. The attendant hears a one-half second burst of tone upon answering and a three-way connection is maintained as described above.

The maintenance of a three-way connection after a time-out has occurred, permits the desired call to be completed, should the called party answer his telephone set or should a busy called line become free before the calling party returns on hook. If the call should be completed in this manner, the attendant then releases from the call.

When the attendant releases from the call, the call connections through the PABX 20A–20N are maintained under the control of the calling party. When the calling party hangs up, all connections are broken. Should the calling party still remain off-hook after the called party hangs up, provisions are included in the junctor circuits in the PABX 20A–20N to break the connections after a predetermined period of time.

If after a call has been completed to the called number, it is desired to recall an attendant (for example, if the calling party has been connected to one department in a store and wishes to be transferred to another department in the same store — either in the same store branch PABX or at another store branch PABX), the called party may simply depress a recall button on his telephone set and, after receiving dial tone, dials or keys 0. The recall signal is transmitted to the PABX common control which causes the automatic steering system (to be discussed in greater detail below) of the invention to connect the calling party to a free attendant position. Ringing voltage is applied to the attendant position by the PABX and the called party hangs up. When the attendant answers the call a ½ second burst of tone is transmitted to the attendant position 26. The attendant then receives the new instructions of the calling party and dials or keys the appropriate directory number of the new called line and a connection is completed to the new called line.

If the calling party desires to speak to a line station which is located in a different PABX from that through which the connection to the centralized attendant position 26 was effected, the attendant may simply dial the appropriate trunk code followed by the directory number corresponding to the particular line circuit in the other PABX and a connection will be established under the control of the common control system via the tie trunk 34 which is connected between the particular calling and called PABX's. After the connection to the other PABX is completed, the attendant releases the connection from the attendant position 26 back to the first PABX.

Figure 2:
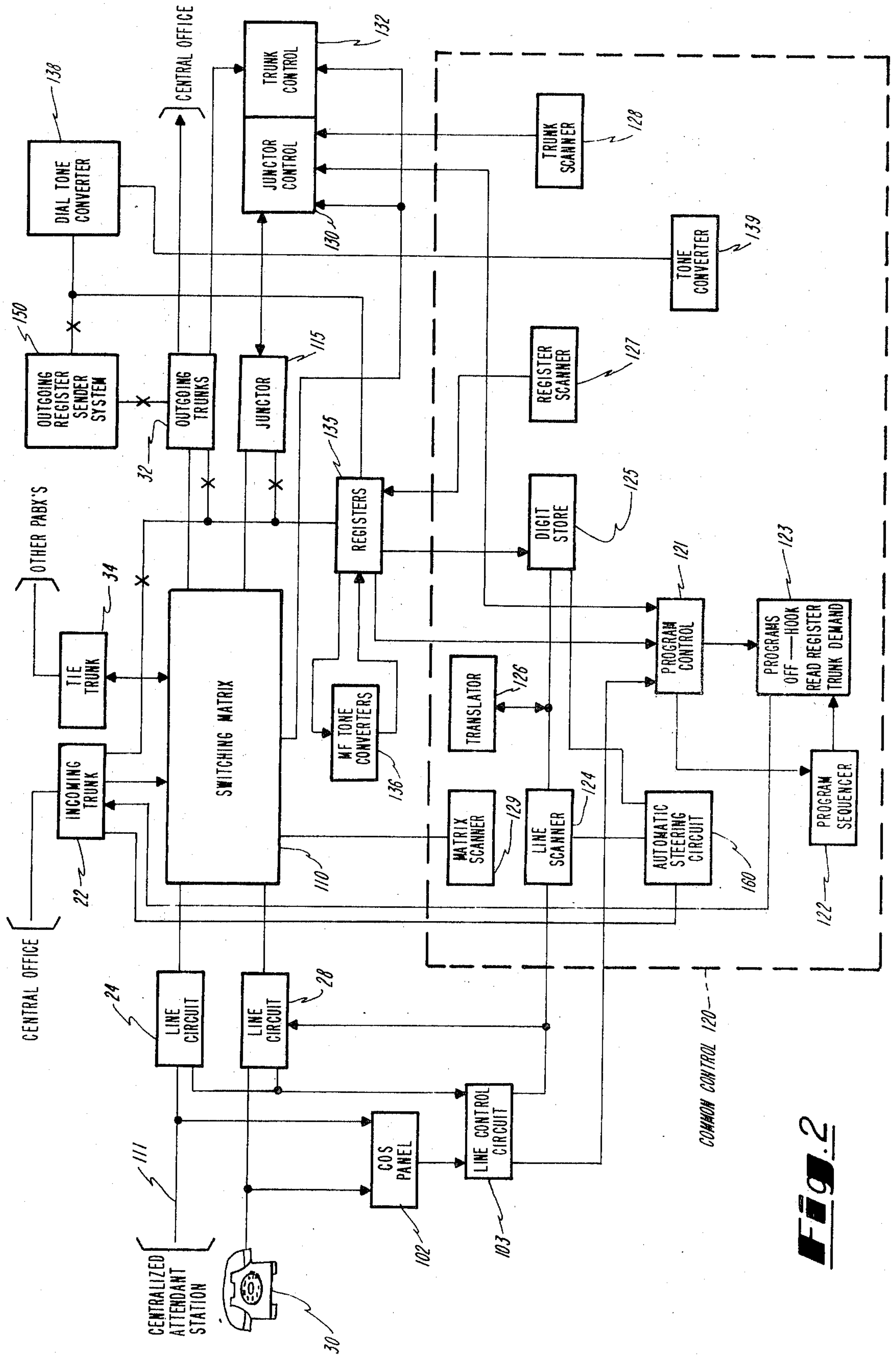
FIG. 2 is a basic block diagram of one of the private branch automatic telephone exchanges shown in FIG. 1, together with portions of the associated circuitry providing the centralized attendant service arrangement.

FIG. 2 illustrates an overall block diagram of a common control PABX system which is typically capable of connecting one local station to another local station or to a central office via a trunk circuit under control of a common control circuit and which has been modified to provide the centralized attendant service arrangement. The PABX system provides a plurality of groups of local stations 30 (of which only a single local station 30 is illustrated in FIG. 2 for purposes of simplicity) and each group of stations 30 is serviced by a line circuit 28 associated with a particular input of a switching matrix 110. In addition, the PABX system provides a plurality of connections 111 (only one shown) to centralized attendant positions and each group of positions is serviced by a line circuit 24 associated with a particular input of the switching matrix 110. The switching matrix 110 is a typical matrix network formed of three stages of reed relay switches providing a first plurality of paths between a given input connected to one of the plurality of stations 30 and a given output connectable to a junctor 115 or an outgoing trunk 32 and a second plurality of paths between a given input connected to one of the plurality of incoming (CAS) trunks 22 and a given output connectable to one of the line circuit groups 24. All of the switching functions of the system are controlled by the common control circuits 120 which perform the functions for an off-hook program, a read register program and a trunk demand program. One or more junctor controls 130 and trunk controls 132 along with a plurality of local registers 135 are also provided for purposes of effecting connection of a particular station requiring service to the common control equipment so that the operations necessary for the establishment of a communication connection within the PABX or outside thereof to the central office may be performed. A class of service panel 102 is provided for each group of line circuits 28 and 24 and indicates for the respective stations served by the line circuits special classes of service which are available for the stations and particular equipment which may be available or used thereby, such as TONE-DIAL equipment as opposed to rotary-dial.

The common control 120 is divided into several separate functional circuits which serve to control the program of operation carried out to perform the switching processes including the path-checking and selection required for connection of a station requesting service to a register or central office trunk. A line control circuit 103 accommodating a plurality of line circuits 28 and 24 serves as an interface between the common control 120 and the individual line circuits 28 and 24. The common control 120 typically includes a program control 121 which selects the program to be run to satisfy the request for service and a program sequencer 122 and a program circuit 123, which implement the program selected by the program control 121. The program control 121, program sequencer 122 and program circuit 123 may typically take the form of a wired logic or other programmed system of the type well known in the art. The various control signals emanating from this program control area of the common control 120 have not been illustrated in detail since the arrangement and functioning of such elements do not directly relate to the present invention and such systems are conventionally provided in several forms in the known prior art.

The common control 120 also includes a line scanner 124 which determines the line demanding service on an originating call and identifies and acts as a line marker when terminating a call. A digit store 125 and a translator 126 are also provided and serve the functions normally associated with such elements, the digit store 125 being associated with an automatic steering circuit 160 which forms the substance of the present invention. A register scanner 127 examines the status of the registers 135 and register sender 150 to determine if an idle register 135 or outgoing register sender 150 is available for use in connection with a calling station or to find the register 135 demanding service to complete a call. A trunk scanner 128 and matrix scanner 129 are associated with the path-selecting and checking operation performed in connection with the switching matrix 110, the trunk scanner 128 serving to scan the junctors 115 and outgoing trunks 132 through the junctor control 130 or trunk control 132 to determine those which may be available to a calling station through the switching station 110. The matrix scanner 129 serves to scan the links in the switching matrix 110 in the process of establishing a path from a given calling station through the switching matrix 110, in accordance with a system disclosed in U.S. Pat. No. 3,660,600, filed May 15, 1970, in the name of Ernest O. Lee, Jr., and assigned to the same assignee as the present application. This patent also includes a detailed description and illustration of the switching matrix 110 and the various elements including the junctor control 130 and trunk control 132 along with the other elements required for the path-finding operation.

Associated with the outgoing trunks 32 is an outgoing register sender system 150, such as disclosed in U.S. Pat. No. 3,671,677, filed July 23, 1970, in the names of Ernest O. Lee, Jr., and John A. Adams, Jr., and assigned to the same assignee as the present application.

Typical operation of the conventional PABX portion of FIG. 2 is initiated by a subscriber at a given station 30 lifting the handset of his telephone, which results in a closing of a direct current loop to the tip T and ring R leads of the line thereby signaling the associated line circuit 28 of the demand for service. The demand is placed through the associated line control circuit 103 to the common control 120 for an offhook program, and the common control causes the line scanner 124 to scan over the lines to identify the particular line requesting service.

The common control 120 causes the line circuit 28 to place a negative potential mark on its mark lead, which is connected to an input of the switching matrix 110. The common control 120 then actuates the matrix scanner 129 initiating the path-checking and selecting operation which will select a single path through the switching matrix 110 from the station 30 requesting service. The common control 120 also causes the trunk scanner 128 to scan over the junctors 115, through the junctor control 130, for an idle junctor 115 and the register scanner to select an idle register 135. The cross points of the selected matrix path are operated at this time connecting the calling line through the junctor 115 to the selected register 135. Dial tone is returned to the calling line from the register 135 through the switching matrix 110, and at this time, the common control 120 releases and is available to handle other requests for service.

After receiving dial tone, the subscriber dials one or more digits which are received and stored in the register 135. The common control 120 analyzes the dialed digits as they are received to determine whether the call to be established is a local call or an outgoing trunk call. If the dialed digits represent a local call within the system, the register 135 calls in the common control 120 for service. The common control 120 starts the register scanner 127 scanning for the register 135 requesting service. When the register 135 has been found, the digits which have been stored in the register 135 are passed to the digit store 125 in the common control 120. The digit store 125 passes this information to the line scanner 124 which marks the desired line and the line is checked to see if it is idle or busy. If the line is idle, the common control 120 calls in the matrix scanner 129 to establish a path from the junctor 115 to the called line. The path through the switching matrix 110 is closed and ringing is applied to the respective lines from the junctor 115. The common control 120 then releases, making it available to serve other requests for service.

Figures 3, 4:
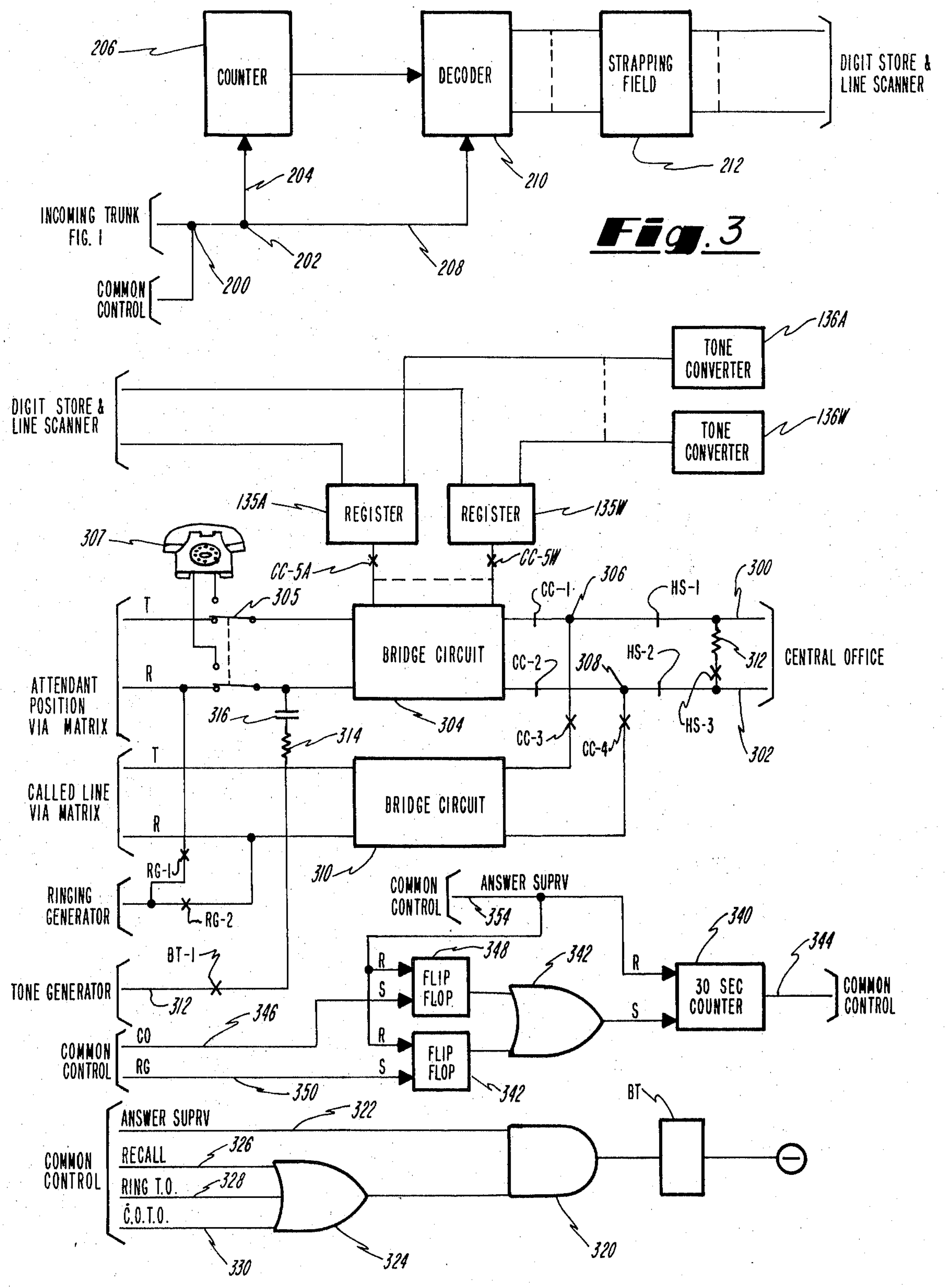
FIG. 3 is an expanded block diagram showing the automatic steering circuit of FIG. 2 in greater detail.
FIG. 4 shows portions of an incoming centralized attendant service trunk, partially in block diagram form and partially in schematic wiring diagram form, constructed in accordance with the present invention.

FIG. 3 shows an expanded block diagram of the automatic steering circuit 160 of the invention. When an incoming trunk 22A–22M has been seized, a ground signal is transmitted from the trunk 22A–22M over a line 200 and applied both via a junction 202 and a line 204 to a counter 206 and via the junction 202 and a line 208 to a binary-decimal decoder 210. The ground pulse steps the count in counter 206 and enables decoder 210. The counter 206 is arranged to count between one and seven (and thereby to designate a particular line circuit in the groups 24A–24X to which to attempt to effect a connection) and then to be returned to a count of one by the next pulse. The output of the counter 206 is decoded by decoder 210 which transmits a three digit decimal output to a strapping field 212, in which the tens and hundreds digits are strapped to identify the particular line circuit group 24A–24X through which an attempt is to be made to connect the call to a centralized attendant position 26 and the units digit corresponds to a particular line circuit within the group 24A–24X. The output of the strapping field 212 is transmitted to the digit store circuit 125 and line scanner 124 and if the desired line is free, a connection is established to that line in the same manner as was described above with reference to operation of the PABX shown in FIG. 2. If the particular line circuit to which the connection was attempted is busy, line scanner 124 detects the busy condition and the common control 120 releases the connections through the switching matrix 110, the incoming trunk 22A–22M again transmits a ground pulse over line 200, the count in counter 206 is advanced by one and an attempt is made to effect a connection to the next line circuit in the particular line circuit group 24A–24X. The count in the counter 206 is similarly advanced until a free line circuit for an attendant position 26 is found.

FIG. 4 shows positions of a centralized attendant service incoming trunk 22A–22M constructed in accordance with the present invention. For simplicity in explanation, only those portions of the trunk circuitry which directly relate to the operation of the centralized attendant service arrangement are shown in FIG. 4. The remaining trunk circuitry is conventional and may be such as that disclosed in U.S. Pat. No. 3,763,321, filed Nov. 29, 1971, in the names of George R. Berguist and Matyas Hugyecz and assigned to the assignee of the present invention. An incoming call from a central office is connected over lines 300 and 302 via break contact pairs HS-1 and HS-2, respectively, break contact pairs CC-1 and CC-2, respectively, and a bridge circuit 304 to the tip (T) and ring (R) lines associated with the attendant position by way of the path selected through switching matrix 110 in the PABX 20A–20N. A double pole two-position switch 305 is shown connected in the tip and ring lines which extend to the attendant position 26 via the switching matrix 110 and is arranged to be thrown and to open the tip and ring lines to the attendant position 26 and to complete connections between the bridge circuit 304 and the tip and ring lines of a local attendant set 307 (via switching matrix 110 and a line circuit group 28A–28Y) located in the PABX when localized attendant service is desired. It will be readily appreciated that each connection between an incoming trunk 22A–22M and the associated centralized attendant positions 26 may be interrupted in a similar manner and all incoming trunks 22A–22M may be connected to one or more local attendant positions.

A path is provided back from the centralized attendant position 26 to the called line via the bridge circuit 304, the contact pairs CC-1 and CC-2, and a pair of junctors 306 and 308, which are connected via make contact pairs CC-3 and CC-4, respectively, and a bridge circuit 310 to the tip and ring lines of the called party via switching matrix 110 and a line circuit group 28A–28Y. A hold circuit including a resistor 312 and a make contact pair HS-3 is connected in series between lines 300 and 302. The contact pairs HS-1, HS-2 and HS-3 are arranged to have their positions changed by a relay (not shown) which is energized each time that an attendant simulates a hookswitch flash at the particular attendant position 26.

A conventional tone generator (not shown) is connected via a line 312, a make contact BT-1, a current-limiting resistor 314 and a capacitor 316 to the ring line of the attendant's station. As will be readily appreciated, tone will be applied to the attendant station from the tone generator for each period of time that the contact pair BT-1 is closed. A ringing generator (not shown) in the PABX 20A–20N is arranged to apply ringing voltage to the ring circuit of the attendant position 26 or of the called line 30A–30Y when a make contact pair RG-1 or RG-2, respectively, is closed by relays (not shown) which are energized by a signal from the common control system 120 in the usual manner.

A relay BT is also provided in each of the incoming trunk circuits 22A–22M and is connected between a negative voltage supply and an AND gate 320. The AND gate 320 is arranged to have an output to energize the BT relay when an attendant is connected to a call connected to the trunk 22A–22M (an ANSWER-SUPRV signal is present on line 322) and an OR gate 324 has an output. The OR gate 324 has an output when any one or more of the following conditions exists:

a. The called party depresses the recall button on his set and a ½ second recall pulse is transmitted from the common control system 120 over line 326;
b. A ½ second ringing time-out pulse is transmitted in the conventional manner from the common control system 120 over line 328 after an idle called line to which the incoming trunk 24A–24X is connected has been ringing for approximately 30 seconds and the call has not been answered; or
c. A ½ second camp-on time-out pulse is transmitted from the common control system 120 over line 330 after a call connected to the incoming trunk 22A–22M has camped on a busy called line for approximately 30 seconds and that line has not become idle.

The trunk circuits 22A–22M are also each provided with timing circuitry, including a 30 second counter 340 for initiating a time-out cycle in the common control system 120 after a call connected to the trunk 22A–22M has been ringing an idle called line or camped on a busy line for 30 seconds. The 30 second counter 340 is arranged to be enabled when an OR gate 342 has an output, and after the counter 340 has been running for 30 seconds, to transmit a signal to the common control system 120 which in turn transmits ½ second time-out pulse to the OR gate 342 when an attendant who has been connected to the trunk 22A–22M by the automatic steering circuit 160 answers the call at the attendant position.

When a call is either camped-on or ringing a called line, the common control 120 transmits either a CO signal over a line 346 (which sets a flip-flop circuit 348 and enables one input to OR gate 342) or an RG signal over a line 350 (which sets a flip-flop circuit 352 and enables the other input to the OR gate 352), respectively. The 30 second counter 340 and flip-flop circuits 348 and 352 are reset by an ANSWER SUPRV signal transmitted from the common control system 120 over a line 354 when an attendant answers a call to which the attendant position is connected.

In operation, when an incoming call is connected to an incoming trunk 22A–22M, the tip and ring lines of the calling line are connected via lines 300 and 302, respectively, and the bridge circuit 304 to the tip and ring lines of an attendant position 26 through the switching matrix 110. Ringing voltage is applied to the attendant position 26 by the ringing circuits (not shown) in the PABX. When the attendant answers the call, loop seizure is extended back to the PABX and tripping of the ringing circuits occur. The attendant receives the instructions of the calling party, simulates a hookswitch flash and the simulated hookswitch flash energizes a relay (not shown) in the common control system 120 which opens the break contact pairs HS-1 and HS-2 and closes the make contact pair HS-3 to complete a hold circuit for the calling line between lines 300 and 302 through resistor 312. The attendant dials or keys the directory number of the called line which is transmitted via the tip and ring lines and bridge circuit 304 to a free one of local registers 135A–135W to which the common control system 120 has connected the attendant position 26 via a closed make contact pair CC-5A through CC-5W. If the attendant station is a pushbutton phone, the multifrequency signals in the seized local register 135A–135W are transmitted to an associated multifrequency tone converter 136A–136W which converts those multifrequency calling signals to dial pulse signals and returns the latter to the local register 135A–135W for processing. If the attendant has a rotary dial set, the dial pulses transmitted therefrom are processed directly by the free local register 135A–135W without the assistance of the associated multifrequency tone converter 136A–136W. The transmitted dial pulses are processed in the local register 135A–135W, which in turn transmits the line number of the called line to the digit store 125 and the line scanner 124. The line scanner 124 marks and seizes the called line under the control of the common control system 120 which energizes a relay (not shown) which closes make contact pairs CC-3 and CC-4 and deenergizes a relay which recloses break contact pairs HS-1 and HS-2 and reopens make contact pair HS-3 to effect a connection between lines 300 and 302 via a bridge circuit 310 to the tip and ring lines of the called party.

Ringing voltage is applied to the called station by the ringing circuits in the PABX 20A–20N. The attendant then releases from the call by depressing a release button at the attendant position 26 and the common control system 120 energizes a relay which opens break contact pairs CC-1 and CC-2 in the conventional manner. If the called line is free, the called line rings until the telephone is answered or until approximately 30 seconds has elapsed, after which time the associated 30 second counter 340 transmits a signal over line 344, to the common control system 120 which begins a time-out cycle and applies a simulated trunk seizure signal to line 200 in the automatic steering circuit 160. If the called station is busy, the connection via the bridge circuit 310 camps-on the called line until that line becomes free. If the call has been camped on the called line for 30 seconds, a release cycle is, initiated by the common control system as described above.

When either a ringing time-out cycle or a camp-on time-out cycle has been initiated, the common control system 120 applies a ground signal over the line 200 to the automatic steering circuit 160 which connects the calling party to a free attendant position 26 while the connection to the called line is maintained. When the attendant answers the call, the common control system 120 transmits an ANSWER SUPRF pulse over lines 322 and 354 to the trunk 22A-22M, the relay BT is energized and a one-half second burst of tone is transmitted to the attendant position.

When it is desired to return a call which has been completed to an attendant, the called party depresses the recall button on his telephone set and dials or keys 0. The common control system 120 transmits a ground pulse to the line 200 in the automatic steering circuit 160 which connects the calling party to a free attendant position 26 and ringing voltage is applied thereto by the PABX 20A–20N. When the attendant answers, the common control system 120 transmits an ANSWER SUPRV signal over lines 322 and 354. The attendant receives a ½ second burst of tone and responds accordingly. The attendant then may dial or key the new number requested by the calling party.

Thus, a centralized attendant service arrangement constructed in accordance with the present invention permits incoming calls to any of a plurality of PABX's, each of which includes a common control, to be extended through the existing PABX switching matrix and over a two-wire line to a centralized attendant position, rather than necessitating separate attendant equipment facilities to be located at each PABX. After the attendant services the request of the calling party — for example, by connecting the calling party to the desired called line — the attendant then releases the connection from the attendant position back to the incoming trunk to which the calling party is connected. Therefore, only the circuitry through which the call is established is maintained in the connection.

In addition, the centralized attendant service arrangement is adaptable for use with both or either of rotary dial and multifrequency signaling equipment and permits conversion to local attendant service in one or more of the PABX's when desired.

The CAS arrangement automatically camps-on busy called lines and automatically reconnects the calling party to a free centralized attendant position when the camped-on called line remains busy for more than 30 seconds or when a free called line is not taken off-hook after that line has been ringing for 30 seconds. In addition, if, after a call has been terminated to a called line, either of the parties wishes to be reconnected to an attendant, the called party may simply depress a recall button on his telephone set and a steering circuit automatically connects the call to a free attendant position. When the attendant answers a call following a time-out or a recall, a short burst of tone is transmitted to the attendant station in order to permit the attendant to distinguish between calls which are connected to the attendant position for the first time and those which are connected to an attendant position for a subsequent time.

Finally, a centralized attendant service arrangement constructed in accordance with the present invention permits an attendant to transfer calls made to a first PABX to a called line located in another PABX within the PABX complex.

While the invention has been described with reference to a particular embodiment thereof, it will be appreciated by those skilled in the art to which the invention pertains that various modifications in form and detail may be made therein without departing from the spirit and scope of the appended claims.

What is claimed is:

1. A centralized attendant service arrangement for use with a plurality of private automatic telephone systems:

each of the telephone systems including at least first and second groups of line circuits, each of the first groups of line circuits including at least one subscriber line circuit;

at least one incoming trunk circuit extending to a central exchange;

connecting means for interconnecting the line circuits, and common control means responsive to multi-digit signals received from a calling line circuit for actuating the connecting means to interconnect the calling line circuit and a called line circuit designated by the multi-digit signals;

the centralized attendant service arrangement comprising:

a plurality of attendant positions disposed substantially in a single location and arranged to provide operator services for incoming calls to the automatic telephone systems, each of the attendant positions being connected to one of the line circuits in the second groups of line circuits and at least one of the second groups of line circuits in each private automatic telephone exchange being connected to at least one attendant position;

routing means within each private automatic telephone exchange responsive to the seizure of an incoming trunk circuit for an incoming call for automatically establishing a connection from the incoming trunk circuit via the connecting means to one of the line circuits in a second group of line circuits, whereby the incoming call is automatically extended to an attendant position following seizure of an incoming trunk by an incoming call;

sequence control means responsive to an attempt to effect a connection to a busy attendant position for automatically releasing the attempt and attempting a connection to an other attendant position;

first switching circuit means responsive to a signal generated at the attendant position for connecting a holding circuit to the calling line and interrupting the connection between the calling line and the attendant line circuit;

second switching circuit means for connecting each incoming trunk, from which an incoming call has been extended to an attendant position, to the common control means, and bridge circuit means in each incoming trunk connected to the attendant position, arranged to be connected to the common control means by the second switching means and arranged to transmit multi-digit calling signals from the attendant position to the common control means after the second switching means connects the bridge circuit means to the common control means, whereby the connecting means interconnects an output of the incoming trunk and the called line circuit designated by the multi-digit signals transmitted from the attendant position.

2. The centralized attendant service arrangement of claim 1 further comprising:

third switching circuit means disposed adjacent the output in each incoming trunk and responsive to the common control means for connecting the calling line via the output to the called line designated by multi-digit signals transmitted from the attendant position when the connecting means connects the output of an incoming trunk circuit to a called line designated by the multi-digit signals transmitted from the attendant position.

3.. The centralized attendant service arrangement of claim 2 further comprising:

fourth switching circuit means responsive to a release signal transmitted from the attendant position for releasing the connection between the attendant position and the incoming trunk after the calling party has been connected to the called line.

4. The centralized attendant service arrangement of claim 3 further comprising:

timing circuit means responsive to the connection of the output of an incoming trunk to a called line for transmitting a simulated trunk seizure indication signal to the routing means when an idle called line remains unanswered and when a busy called line remains busy for more than a predetermined period of time, the routing means responding by establishing a connection from the incoming trunk circuit via the connecting means to one of the line circuits in the second group of line circuits.

5. The centralized attendant service arrangement of claim 4 further comprising:

means responsive to a recall signal transmitted from the called line for trnasmitting a simulated trunk seizure signal to the routing means, the routing means responding thereto by establishing a connection from the incoming trunk circuit via the connecting means to one of the line circuits in the second group of line circuits.

6. The centralized attendant service arrangement of claim 5 further comprising:

fifth switching circuit means responsive to transmission of a simulated trunk seizure signal to the routing means for transmitting an audible indication of the simulated trunk seizure to the attendant position which is connected to the incoming trunk by the routing means.

* * * * *